(12) United States Patent
Eddu et al.

(10) Patent No.: US 12,314,945 B2
(45) Date of Patent: May 27, 2025

(54) TICKET AUTHENTICATION AND AUDIT SERVICE

(71) Applicant: NCR Voyix Corporation, Atlanta, GA (US)

(72) Inventors: Praneeth Erwin Luck Eddu, Conyers, GA (US); Andrew Michael Reusche, Roswell, GA (US)

(73) Assignee: NCR Voyix Corporation, Atlanta, GA (US)

( * ) Notice: Subject to any disclaimer, the term of this patent is extended or adjusted under 35 U.S.C. 154(b) by 432 days.

(21) Appl. No.: 17/489,648

(22) Filed: Sep. 29, 2021

(65) Prior Publication Data
US 2023/0098692 A1   Mar. 30, 2023

(51) Int. Cl.
G06Q 20/40       (2012.01)
G06F 9/54        (2006.01)
G06Q 20/38       (2012.01)
H04L 9/32        (2006.01)

(52) U.S. Cl.
CPC ............ *G06Q 20/401* (2013.01); *G06F 9/54* (2013.01); *G06Q 20/3827* (2013.01); *H04L 9/3236* (2013.01); *G06Q 2220/00* (2013.01)

(58) Field of Classification Search
CPC ............. G06Q 20/401; G06Q 20/3827; G06Q 2220/00; G06F 9/54; H04L 9/3236
See application file for complete search history.

(56) References Cited

U.S. PATENT DOCUMENTS

| 6,223,166 | B1 * | 4/2001 | Kay ...................... G06Q 10/02 705/5 |
| 7,093,130 | B1 * | 8/2006 | Kobayashi .............. H04L 63/12 713/168 |
| 2016/0337338 | A1 * | 11/2016 | Burch ..................... H04L 63/10 |
| 2017/0017947 | A1 * | 1/2017 | Robinton ............... G06Q 20/40 |
| 2017/0228665 | A1 * | 8/2017 | Levin ....................... G06K 5/00 |

FOREIGN PATENT DOCUMENTS

CN             106897759 A   *  6/2017    ....... G06K 19/06037

* cited by examiner

*Primary Examiner* — Jamie R Kucab
(74) *Attorney, Agent, or Firm* — Schwegman Lundberg & Woessner, P.A.

(57) ABSTRACT

When an online ticket is purchased, a record is maintained in a third-party online service; the record does not include the unique serial number of the ticket. The unique serial number is salted and/or hashed to generate a unique cryptographic value, which is stored with the record by the service. When the online ticket is redeemed, the unique serial number is again salted and/or hashed to produce a candidate cryptographic value. The records of the service are searched using the candidate cryptographic value and upon a match, the appropriate matching record is returned to the redeeming entity associated with the ticket by the service as evidence of authentication and as auditing information associated with the original purchased ticket.

12 Claims, 3 Drawing Sheets

TICKET AUTHENTICATION AND AUDIT SERVICE

BACKGROUND

Increasingly, tickets of all types are being purchased and redeemed electronically. In fact, because of COVID-19 many large organizations now only handle and allow electronic tickets. For example, Major League Baseball (MLB) and the NCAA have prohibited printed tickets.

Yet some tickets are still printed, particularly lottery tickets, which are issued and administered by government agencies/commissions. There are largely two types of lottery tickets. The first type is electronically purchased (through lottery vendors), printed and provided to customers, scanned by the vendor when the customers redeem winning tickets, and redeemed online by the vendors on behalf of the customers. The first type of ticket largely consists of number-based games of chance, such as Powerball®, Mega Millions®, and other number-based lottery tickets (e.g., Keno®, pick 3, pick 4, etc.). The second type of ticket is largely associated with scratch-offs, which are purchased as printed tickets but are still redeemed online by lottery vendors with the appropriate government agencies that issued the scratch-offs on behalf of winning customers.

A significant issue with electronic tickets is fraud since these tickets are largely redeemed online. Additionally, most lottery commissions started issuing and redeeming tickets without sufficient online authentication and auditing capabilities. Furthermore, printed scratch-offs are frequently stolen, but the lottery commissions have no effective audit trail to authenticate whether a redeemed ticket was stolen or legitimately purchased.

However, storing the serial numbers of the lottery tickets online poses substantial risks that winning serial numbers can be stolen and then redeemed through a counterfeit printed ticket or through other online means (such as when a vendor is associated with stealing a winning serial number and then uses an in-store terminal to redeem the ticket by manually entering the winning serial number on the in-store terminal).

As a result, lottery commissions and other ticket issuing and redeeming organizations need a secure online authentication and auditing service for which the serial numbers of the tickets being purchased and redeemed are not retained in any online storage of the secure online authentication and auditing service.

SUMMARY

In various embodiments, a system and methods for providing a ticket authentication and auditing service are provided.

According to an embodiment, a method for operating a ticket authentication and auditing service is presented. A ticket purchase request for a purchase of a ticket is received from a vendor terminal. A unique ticket identifier for the ticket, a vendor terminal identifier for the vendor terminal, a current calendar date, and a current time of day are obtained. A cryptographic value is generated based on the unique ticket identifier and the cryptographic value is stored in a record along with the vendor terminal identifier, the current calendar date, and the current time of day as auditing and authentication information when the ticket is subsequently redeemed. The unique ticket identifier is removed from memory and just the record without any reference to the unique ticket identifier is retained.

DETAILED DESCRIPTION

Figure 1:
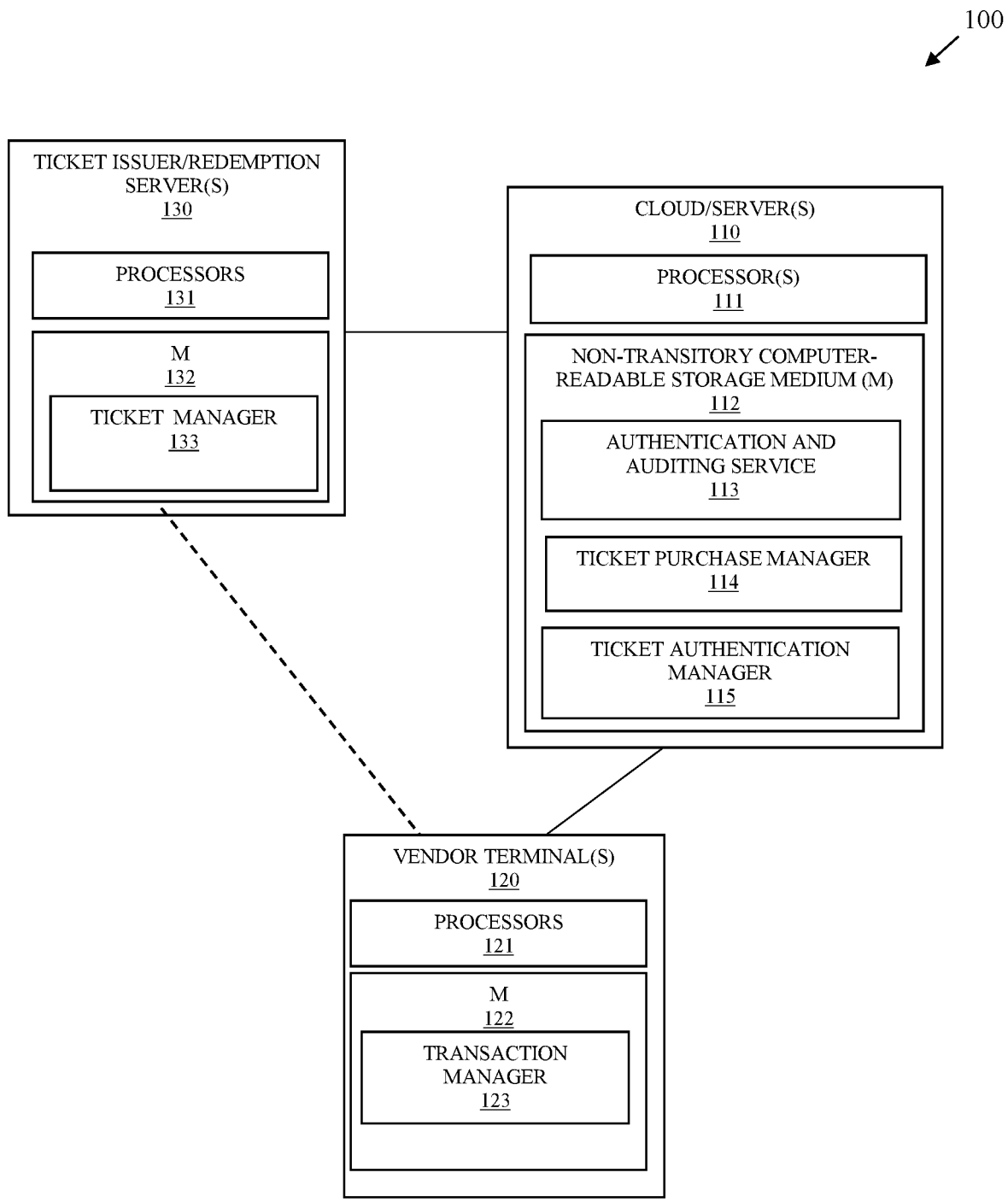
FIG. 1 is a diagram of a system for providing a ticket authentication and auditing service, according to an example embodiment.

FIG. 1 is a diagram of a system/platform 100 for providing and operating a ticket authentication and auditing service, according to an example embodiment. It is to be noted that the components are shown schematically in greatly simplified form, with only those components relevant to understanding of the embodiments being illustrated.

Furthermore, the various components (that are identified in system/platform 100) are illustrated and the arrangement of the components are presented for purposes of illustration only. It is to be noted that other arrangements with more or less components are possible without departing from the teachings of providing and operating a ticket authentication and auditing service, presented herein and below.

System/platform 100 (herein after just "system 100") provides a processing environment by which electronic tickets can be authenticated upon redemption and audit information associated with redeemed tickets provided to a ticket issuer server. Moreover, the unique ticket serial numbers/strings are not electronically stored, such that should system 100 be compromised there is no danger that a hacker or a malicious program can acquire the unique ticket numbers/strings for nefarious purposes.

As used herein, the terms "customer," "consumer," "ticket redeemer," and/or "ticker purchaser" may be used interchangeably and synonymously herein and below. This refers to an individual that has purchased and/or is redeeming a ticket.

Furthermore, the terms "redeem," "redemption," and/or "redeeming" refers to a ticket being presented by a customer for purposes of entry into an establishment, acquisition of an item or a discount on an item, and/or cashing out a winning lottery ticket.

As will be demonstrated herein and below, the system and methods presented provide a mechanism by which electronic tickets purchased and redeemed are audited and authenticated on behalf of ticket issuers and/or ticket redeemers. The unique serial number/string of the ticket is never electronically stored by the presented ticket authentication and auditing service; rather, when the ticket is originally purchased, the unique serial number/string is hashed and/or salted and hashed with a resulting cryptographic value stored along with a record comprising auditing information that is collected from a vendor who sold the ticket to the customer. When the ticket is subsequently presented for redemption, the unique serial number/string is again hashed and/or salted and hashed and the resulting candidate cryptographic value is used to search audit records of the ticket authentication and auditing service. If no match in the audit records is found for a ticket being redeemed, the ticket issuer/redeemer is notified that the ticket cannot be authenticated. If a match is found, an authenticated message is sent to the ticket issuer/redeemer along with all or some portion of the auditing information that corresponds to the verified ticket (assuming the auditing information is requested by the ticket issuer/redeemer).

System 100 comprises a cloud/server 110, one or more ticket issuer/redemption servers 130, and one or more ticket vendor terminals 120.

Cloud/Server 110 comprises at least one processor 111 and a non-transitory computer-readable storage medium 112. Medium 112 comprises executable instructions for ticket authentication and auditing service 113 (hereinafter just "service 113), a ticket purchase manager 114 (hereinafter just "purchase manager 114"), and a ticket authentication manager 115 (hereinafter just "authentication manager 115"). The executable instructions when provided to and executed by processor 111 from medium 112 cause processor 111 to perform the processing discussed herein and below for service 113, purchase manager 114, and authentication manager 115.

Each ticket issuer/redemption server 120 (hereinafter just "issuer/redemption server 120") comprises at least one processor 121 and a non-transitory computer-readable storage medium 122. Medium 122 comprises executable instructions for a ticker manager 123. The executable instructions when provided to and executed by processor 121 from medium 122 cause processor 121 to perform the processing discussed herein and below for ticket manager 123.

Each vendor terminal 130 comprises at least one processor 131 and a non-transitory computer-readable storage medium 132. Medium 132 comprises executable instructions for a transaction manager 133. The executable instructions when provided to and executed by processor 131 from medium 132 cause processor 131 to perform the processing discussed herein and below for transaction manager 133.

FIG. 1 illustrates a broken line between vendor terminal 120 and issuer/redemption server 130, a solid line between vendor terminal 120 and cloud/server 110, and a solid line between cloud/server 110 and issuer/redemption server. The broken line is intended to illustrate an optional embodiment, in which cloud/server 110 acts as a transparent proxy to vendor terminal 120; such that vendor terminal 120 is not required to be aware of the cloud/server 110 and no modifications or changes are needed to any source code on vendor terminal 120. In a different embodiment, cloud/server acts as forward proxy to vendor terminal 120, such that vendor terminal 120 is aware of and actively interacts with cloud/server 110 through an Application Programming Interface (API).

During a purchase of a ticket by a customer at a vendor store, the customer may be purchasing an online ticket or purchasing a printed ticket from issuer/redemption server 130. Vendor terminal 120 may be a Point-Of-Sale (POS) terminal operated by a clerk of the vendor during the purchase or vendor terminal 120 may be a Self-Service Terminal (SST) or kiosk that is self-operated by the customer. In the case of a printed ticket being purchased, the barcode or Quick Response (QR) code on the ticket is either scanned by the clerk (when vendor terminal 130 is a POS terminal) or scanned automatically when being dispensed (when vendor terminal 130 is an SST).

The scanner barcode/QR code information is directly sent by transaction manager 123 to ticket purchase manager (114) when cloud/server 110 is a forward proxy using an API or the scanner barcode/QR code is intercepted by ticket purchase manager 114 when transaction manager 123 is attempting to send to ticket manager 133 when cloud/server 110 is a transparent proxy.

When the ticket is a printed ticket, ticket purchase manager 114 identifies the ticket serial number/string and any security code from the scanned barcode/QR information. Additionally, a vendor terminal identifier associated with vendor terminal 120 is obtained along with a current calendar date and a current time of day. Ticket purchase manager 114 concatenates the ticket serial number/string with any security code and provides to a hashing algorithm that produces a sufficiently large enough cryptographic value. Alternatively, ticket purchase manager 114 concatenates the ticket serial number/string with any security code and provides to a salting algorithm to produce a salt value. The salting algorithm randomly generates the salt value (string of characters) of a randomly generated size. The salt value is prepended or concatenated to the ticket serial number/string with any security code and provided as a new string to the hashing algorithm, which returns a cryptographic value. Ticket purchase manager 114 creates a record for storage on cloud/server 110 and stores in the record: the cryptographic value, the salt value (if the salting algorithm was used), the vendor terminal identifier, the current date, and the current time.

In an embodiment, the ticket is a lottery ticket issued by a ticket manager 133 associated with a lottery commission or issued as a scratch-off by the lottery commission. The ticket serial number is a string of digit characters of approximately 20 numeric digits in length and the security code is a string of additional 30 alphanumeric characters (both digit and non-digit characters). The serial number and security code are concatenated together to form a string of approximately 50 characters (comprising alphanumeric characters). When salting is used (as discussed above), the salt value is a string of a randomly generated length alphanumeric characters. Thus, assuming brute force could be used by a hacker to crack a hash value of a string having a known length of 50 characters, the hacker would also have to guess the length of the salt value, which is extremely unlikely and nearly impossible to do by brute force.

When the ticket is purchased online, the ticketed serial number and any security code is dispensed back to transaction manager 123 from issuer/redemption server 130, such that this information is obtained by ticket purchase manager 114 on the communication back from ticket manager 133 to transaction manager 123. However, the vendor terminal identifier, the current date, and the current time of day can be obtained when transaction manager 123 requests the online ticket from ticket manager 133. Ticket purchase manager 114 performs the same hashing and record generation that was discussed above for the printed ticket purchase.

Ticket purchase manager 114 does not electronically store nor record the ticket serial number/string or the security code (when used). It is just and only the cryptographic value and salt value (optional) that are stored along with the vendor terminal identifier, the current date, and the current time of day (time of purchase). This ensures that should cloud/server 110 be compromised by a hacker, there is no threat that ticket serial number/string and security code are obtained by the hacker. This provides security to the issuer/redemption entities associated with the issuer/redemption server 130 while at the same time provides authentication capabilities and auditing capabilities as are discussed below through cloud/server 110.

When a ticket is being redeemed by a customer, vendor terminal 120 may be but is not required to be the same vendor terminal 120 where the original ticket was purchased by the customer. That is the purchasing vendor terminal 120 may be different from the redeeming vendor terminal 120, but in some cases can be the same vendor terminal 120.

When a customer redeems a ticket at a redeeming vendor terminal 120, the barcode/QR code is scanned and directly provided by transaction manager 123 to authentication manager 115 (cloud server 110 is a forward proxy to vendor terminal 120) or is intercepted by authentication manager 115 when transaction manager 123 sends to ticket manager 133 (cloud server 110 is a transparent proxy to vendor terminal 120).

Authentication manager 115 obtains the winning ticket's serial number/string and any security code from the scanned barcode/QR information and concatenates the serial number/string and performs hashing and obtains a candidate cryptographic value for the ticket being redeemed at redeeming vendor terminal 120. If salting was used, the assigned salt value to the candidate cryptographic value is obtained by matching the candidate cryptographic value to a record and obtaining the previously assigned salt value, next the salt value obtained from the matching record is pre-pended to or concatenated onto the serial number/string any concatenated security code and hashed to obtain a modified cryptographic value. The modified cryptographic value is compared against the stored cryptographic value of the matching record to determine if the ticket was previously purchased or not. When it was not, the ticket is invalid, when it was previously purchased the ticket is valid and the audit information in the record is provided to the ticket manager (audit information includes the purchasing vendor terminal identifier, purchase date, and purchase time of day.

When salting and hashing is used and no salted value is found in the stored records (no matching record), the salt value and hashing need not be processed because if the salt value is not found, then there is no record of the ticket having been purchased, such that authentication manager 115 knows the ticket being redeemed to be fraudulent. When the salt value is found, the hashing with the salt value is performed to obtain the candidate cryptographic value.

Authentication manager 115 compares the candidate cryptographic value (calculated from the ticket using just the serial number/string (along with any security code) or calculated from the ticket using the salted and hashed technique (when a salt value was found in the stored records)) and searches the stored records for a matching cryptographic value. A match indicates that the ticket being redeemed at redeeming vendor terminal 120 can be authenticated. No match indicates that the ticket at the redeeming vendor terminal 120 cannot be authenticated. Authentication manager 115 provides an authenticated message along with the details of the matching record to service 113 or authentication manager 115 provides a not-authenticated message to service 113 for the ticket being processed for redemption from redeeming vendor terminal 120.

Service 113 uses an API to communicate to ticket manager 133 the authenticated message or non-authenticated message. When an authenticated message is being sent, service 113 also includes the matching records details as auditing information (purchasing vendor terminal identifier, date of purchase, and time of day of purchase) with the authenticated message sent to ticket manager 133. Ticket manager 133 may uses the authenticated message or non-authenticated message to supplement any authentication processes performed independently by issuer/redemption server 130 on the ticket being redeemed at redeeming vendor terminal 120. Ticket manager 133 may also use service 113 as a sole authentication of any redeemed tickets. Ticket manager 133 then sends a message back to vendor terminal 120 indicating whether the ticket should or should not be redeemed. In an embodiment, ticket manager 133 may also use the audit information supplied by service 113 for purposes of providing an audit trail for any redeemed ticket, such as by updating any matching record with the redeeming vendor terminal identifier, redeemed date, and redeemed time of day.

In an embodiment, additional audit information is captured and stored in a redeemed tickets corresponding audit record maintained by cloud/server 110. The additional audit information may include the redeeming vendor terminal identifier, the redemption date, and the redemption time of day. Thus, the audit details in the matching for a successfully authenticated redeemed ticket may include the purchasing vendor terminal identifier, the redeeming vendor terminal identifier, the purchase date, the redemption date, the purchase date time of day, and the redemption date time of day.

In an embodiment, service 113 may further provide via an interface reporting of customized audit information for redeemed and/or purchased tickets back to issuer/redemption server 130. Reports can be generated by service 113 through the interface based on any combination of purchasing vendor terminal identifier, redeeming terminal identifier, vendor terminal identifier independent of any flag associated with redeeming or purchasing, redeeming dates, purchasing dates, redeeming times of day, purchasing time of day, and or specific ticket identifiers. In some cases, service 113 may further retain location information for the vendor terminals, vendor information for each vendor associated with a vendor terminal identifier, and/or store identifiers for stores linked to specific vendor terminal identifiers. This allows for location-based, vendor-based, and/or store-based reporting of auditing information back to issuer/redemption server 130 through the interface.

In an embodiment, service 113 provides lottery ticket authentication and auditing features to a lottery administrator or lottery commission for lottery tickets issued by the lottery administrator/commission.

In an embodiment, service 113 provides venue ticket authentication and auditing features to a venue for venue tickets issued by the venue.

In an embodiment, service 113 provides value-based or discount-based ticket authentication and auditing features to an establishment that issued the value-based or discount-based tickets.

In an embodiment, purchase manager 114 and authentication manager 115 are subsumed into and are integrated components or modules of service 113.

In an embodiment, the features associated with issuing online tickets are provided by a separate provider, in such cases the separate provider interacts with purchase manager 114 through an API to provide a purchased ticket's serial number/string any security code that is being generated by the separate provider to purchase manager 114. In this embodiment, the issuer server 130 may be separate from the redemption server 130 but communications flowing between these separate servers 130 and vendor terminals 120 still pass-through cloud/server 110 for auditing and authentication of service 113.

Figure 2:
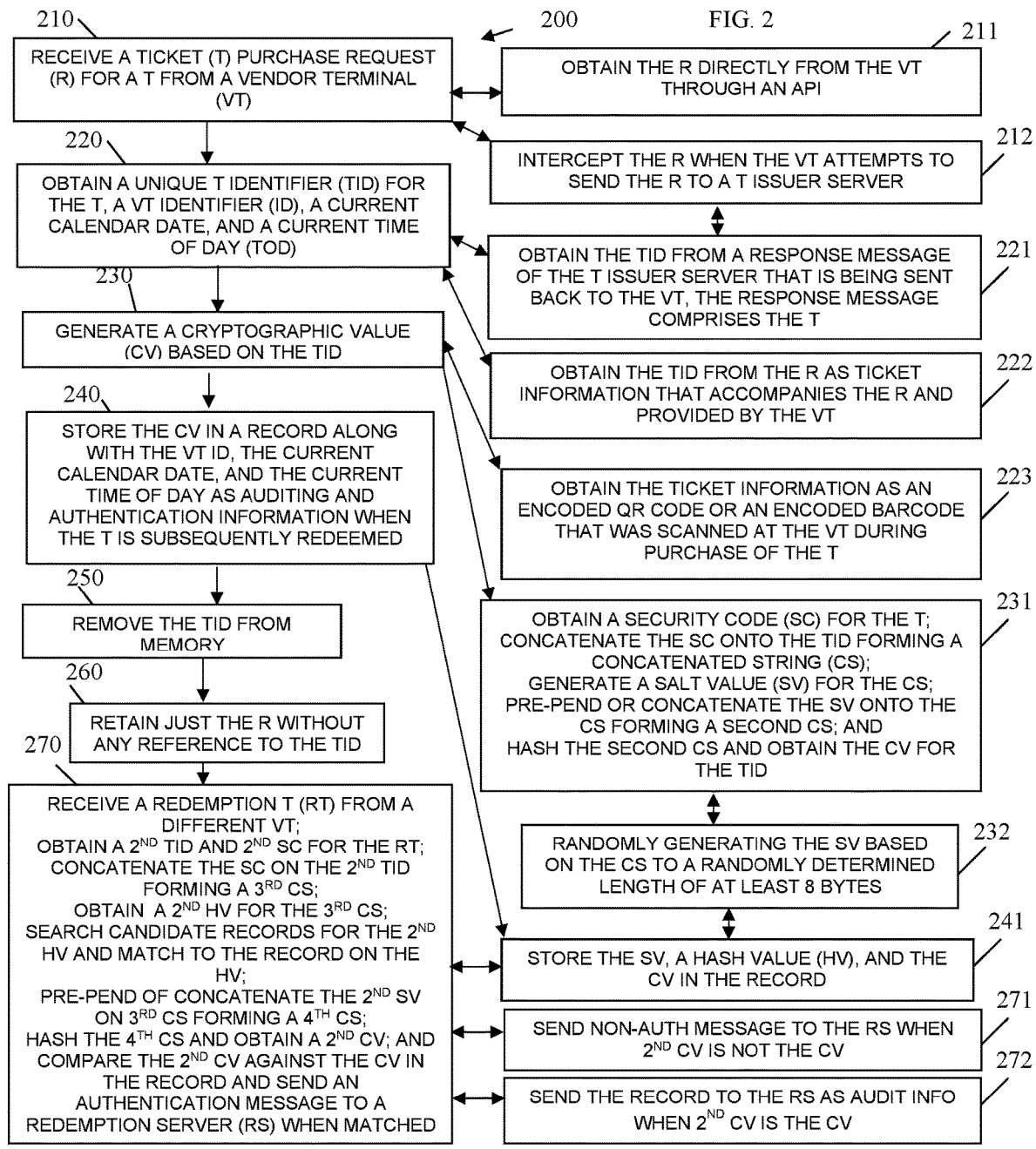
FIG. 2 is a diagram of a method for operating a ticket authentication and auditing service, according to an example embodiment.
Figure 3:
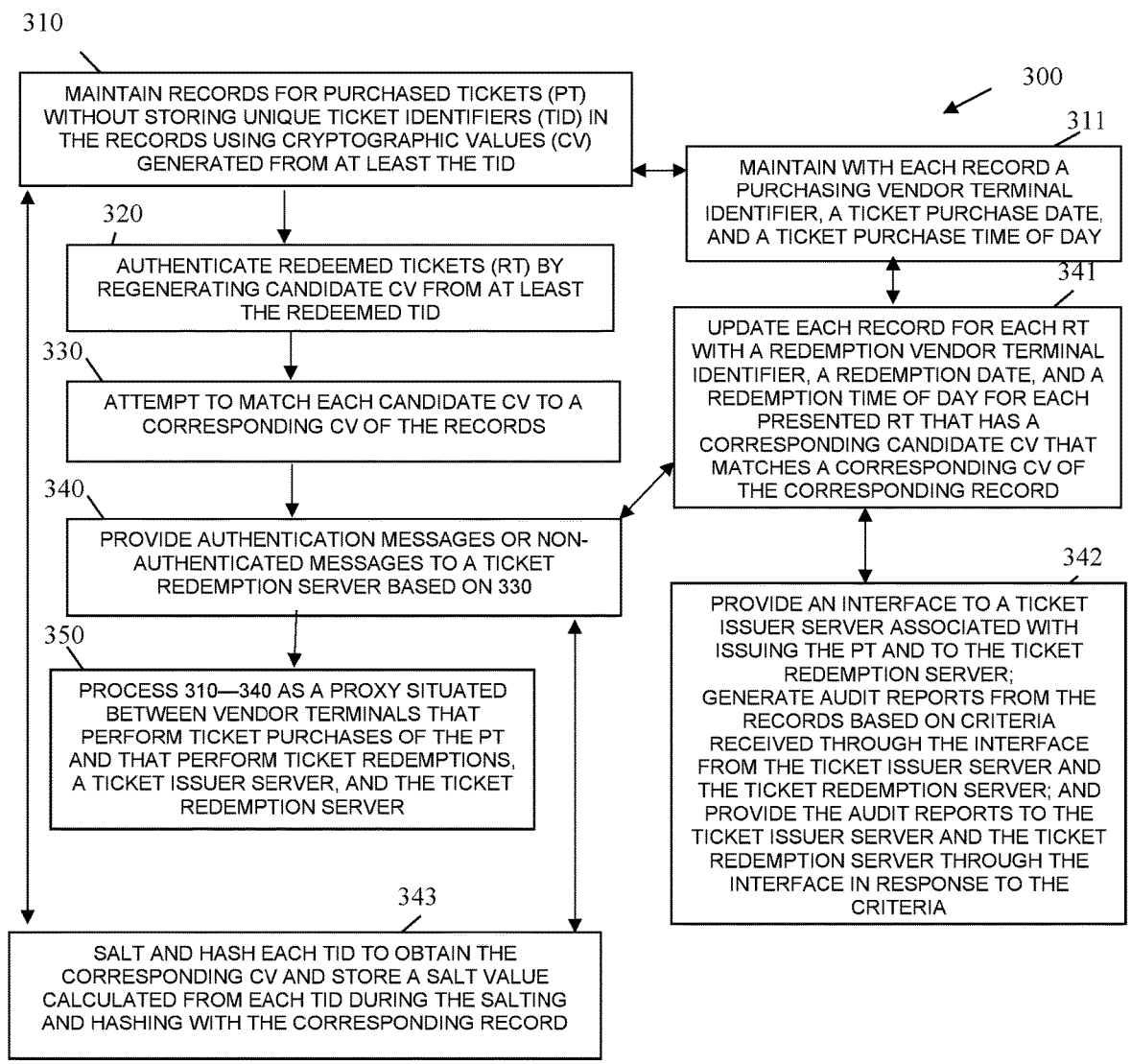
FIG. 3 is a diagram of another method for operating a ticket authentication and auditing service, according to an example embodiment.

The above-referenced embodiments and other embodiments are now discussed within FIGS. 2-3.

FIG. 2 is a diagram of a method 200 for operating a ticket authentication and auditing service, according to an example embodiment. The software module(s) that implements the method 200 is referred to as a "ticket auditor and authenticator." The ticket auditor and authenticator is implemented as executable instructions programmed and residing within memory and/or a non-transitory computer-readable (processor-readable) storage medium and executed by one or more processors of one or more devices. The processor(s) of the device that executes the ticket auditor and authenticator are specifically configured and programmed to process the ticket auditor and authenticator. The ticket auditor and authenticator may have access to one or more network connections during its processing. The network connections can be wired, wireless, or a combination of wired and wireless.

In an embodiment, the device that executes the ticket auditor and authenticator is cloud 110. Cloud 110 comprises a plurality of servers logically cooperating and accessible as a single server 110 (cloud 110).

In an embodiment, the device that executes the ticket auditor and authenticator is a server 110 that is separate from any given ticket issuer/redemption 120.

In an embodiment, the ticket auditor and authenticator is all or some combination of 113, 114, and/or 115.

At 210, the ticket auditor and authenticator receives a ticket purchase request for a ticket being purchased from a vendor terminal.

In an embodiment, at 211, the ticket auditor and authenticator obtains the ticket purchase request from the vendor terminal through an API. In this embodiment, the ticket auditor and authenticator processes as a forward proxy to the vendor terminal.

In an embodiment, at 212, the ticket auditor and authenticator intercepts the ticket purchase request when the vendor terminal attempts to send the ticket purchase request to a ticket issuer server. In this embodiment, the ticket auditor and authenticator processes as a transparent proxy to the vendor terminal.

At 220, the ticket auditor and authenticator obtains a unique ticket identifier for the ticket, a vendor terminal identifier for the vendor terminal, a current date (reflecting a purchase date of the ticket), and a current time of day (reflection a purchase time of day of the ticket on the purchase date).

In an embodiment of 212 and 220, at 221, the ticket auditor and authenticator obtains the unique ticket identifier from a response message of the ticket issuer server that is being sent back to the vendor terminal; the response message comprises the ticket and ticket information for the ticket. In this embodiment, the ticket is being purchased online and not associated with a ticket that is already printed and being purchased by a customer at the vendor terminal.

In an embodiment of 221, at 222, the ticket auditor and authenticator obtains the unique ticket identifier from the ticket identifying information as ticket information that accompanies the ticket purchase request and that is provided by the vendor terminal. In this embodiment, the ticket being purchased is already printed and is being purchased by the customer at the vendor terminal.

In an embodiment, at 223, the ticket auditor and authenticator obtains ticket information as an encoded QR code or an encoded barcode that was scanned at the vendor terminal during purchase of the ticket.

At 230, the ticket auditor and authenticator generates a cryptographic value based on the unique ticket identifier.

In an embodiment, at 231, the ticket auditor and authenticator obtains a security code for the ticket and concatenates the security code onto the unique ticket identifier forming a concatenated string. The ticket auditor and authenticator generates a salt value using a salting or hashing algorithm forming a concatenated string. The ticket auditor and authenticator pre-pends or concatenates the salt value onto the concatenated string forming a second concatenated string. The ticket auditor and authenticator hashes using a hashing algorithm the second concatenated string and obtains the cryptographic value for the unique ticket identifier.

In an embodiment of 231 and at 232, the ticket auditor and authenticator randomly generates the salt value based on the concatenated string of the unique ticket identifier and the security code to a randomly determined length of at least 8 bytes.

At 240, the ticket auditor and authenticator stores the cryptographic value in a record along with the vendor terminal identifier, the purchase date, and the purchase time of day as auditing and authentication information when the ticket is subsequently redeemed.

In an embodiment of 232 and 240, at 241, the ticket auditor and authenticator stores the salt value, a hash value generated by hashing the concatenated string of 231, and the cryptographic value in the record.

At 250, the ticket auditor and authenticator removes the unique ticket identifier from memory and the unique ticket identifier is not stored or retained anywhere by the ticket auditor and authenticator. All remnants and data of the unique ticket identifier is removed, such that it cannot be acquired should a processing environment of the ticket auditor and authenticator be compromised.

At 260, the ticket auditor and authenticator retains just the record without any reference to the unique ticket identifier.

In an embodiment of 241 and 260, at 270, the ticket auditor and authenticator receives a redemption ticket from a different vendor terminal (note that this also can be from the original vendor terminal that sold the ticket as well). The ticket auditor and authenticator obtains a second unique ticket identifier and a second security code from the redemption ticket and concatenates together to form a third concatenated string. The ticket auditor and authenticator obtains a second hash value for the third concatenated string and searches candidate records for the second hash value and matches the second hash value to the record of 240 on its hash value. It is noted that if no match is found, a non-authenticated message is sent to a redemption server. Upon a match, the ticket auditor and authenticator pre-pends or concatenates the particular salt value of the matching record on the third concatenated string forming a fourth concatenated string. The ticket auditor and authenticator hashes the fourth concatenated string and obtains a second cryptographic value and compares the second cryptographic value against the cryptographic value in the record of 240. The ticket auditor and authenticator sends an authentication or an authenticated message to the redemption server when the second cryptographic value matches with the cryptographic value of the record.

In an embodiment of 270 and at 271, the ticket auditor and authenticator sends a non-authenticated message to the redemption server when the second cryptographic value is not matched to or is not the cryptographic value of the record.

In an embodiment of 270 and at 272, the ticket auditor and authenticator sends vendor terminal identifier of the record, the purchase date of the record, and the purchase time of day of the record to the redemption server as audit or auditing information to support as evidence the authentication of the redemption ticket.

FIG. 3 is a diagram of another method 300 for operating a ticket authentication and auditing service, according to an example embodiment. The software module(s) that implements the method 300 is referred to as a "ticket authentication and auditing service." The ticket authentication and auditing service is implemented as executable instructions programmed and residing within memory and/or a non-transitory computer-readable (processor-readable) storage medium and executed by one or more processors of a device. The processors that execute the ticket authentication and auditing service are specifically configured and programmed for processing the ticket authentication and auditing service. The ticket authentication and auditing service may have access to one or more network connections during its processing. The network connections can be wired, wireless, or a combination of wired and wireless.

In an embodiment, the device that executes the ticket authentication and auditing service is cloud 110. In an embodiment, the device that executes the ticket authentication and auditing service is server 110.

In an embodiment, the ticket authentication and auditing service is all of or some combination of 113, 114, 115, and/or method 200 of FIG. 2.

The ticket authentication and auditing service presents another and, in some ways, enhanced processing perspective from that which was discussed above for cloud 110 and method 200.

At 310, the ticket authentication and auditing service maintains records for purchased tickets without storing unique ticket identifiers in the records using cryptographic values generated from at least the unique ticket identifiers. At no point is any unique ticket identifiers stored within the processing environment of the ticket authentication and auditing service and each unique ticket identifier is removed from memory once its corresponding cryptographic value is calculated and/or generated.

In an embodiment, at 311, the ticket authentication and auditing service maintains with each record a purchasing vendor terminal identifier, a ticket purchase date, and a ticket purchase time of day.

At 320, the ticket authentication and auditing service authenticates redeemed tickets by regenerating candidate cryptographic values from at least the redeemed ticket identifiers.

At 330, the ticket authentication and auditing service attempts to match each candidate cryptographic value to a corresponding cryptographic value of the records.

At 340, the ticket authentication and auditing service provides authentication messages or non-authentication messages to a ticket redemption server based on 330.

In an embodiment of 311 and 340, at 341, the ticket authentication and auditing service updates each record for each redeemed tickets with a redemption vendor terminal identifier, a redemption date, and a redemption time of day for each presented redeemed ticket that has a corresponding candidate cryptographic value that matches a corresponding cryptographic value of the corresponding record.

In an embodiment of 341 and at 342, the ticket authentication and auditing service provides an interface to a ticker issuer server associated with issuing the purchased tickets and to the ticker redemption server. The ticket authentication and auditing service generates audit reports from the records based on criteria received through the interface from the ticker issuer server and the ticket redemption server. The ticket authentication and auditing service provides the audit reports to the ticket issuer server and the ticket redemption server through the interface in response to processing the received criteria against the records.

In an embodiment of 310 and 340, at 343, the ticket authentication and auditing service salts and hashes each unique ticket identifier to obtain the corresponding cryptographic value and stores a salt value calculated from each unique ticket identifier during the salt and hash processing with the corresponding record.

In an embodiment, at 350, the ticket authentication and auditing service (310-340) is processed or provided as a proxy situated between the vendor terminals that perform ticket purchases of the purchased tickets and that perform ticket redemptions, a ticker issuer server, and the ticket redemption server. The proxy may be a transparent or a forward proxy to the vendor terminals.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
receiving a ticket purchase request for a purchase of a ticket from a vendor terminal;
obtaining a unique ticket identifier for the ticket, a vendor terminal identifier for the vendor terminal, a current calendar date, and a current time of day;
generating a cryptographic value based on the unique ticket identifier using a hashing algorithm that incorporates a security code and a randomly generated salt value;
wherein the salt value is pre-pended or concatenated onto a concatenated string formed by the security code and the unique ticket identifier;
storing the cryptographic value in a record along with the vendor terminal identifier, the current calendar date, and the current time of day as auditing and authentication information when the ticket is subsequently redeemed;
removing the unique ticket identifier from memory; and
retaining just the record without any reference to the unique ticket identifier.

2. The method of claim 1, wherein receiving further includes obtaining the ticket purchase request directly from the vendor terminal through an Application Programming Interface (API).

3. The method of claim 2, wherein receiving further includes intercepting the ticket purchase request when the vendor terminal attempts to send the ticket purchase request to a ticket issuer server.

4. The method of claim 3, wherein obtaining further includes obtaining the unique ticket identifier from a response message of the ticket issuer server that is being sent back to the vendor terminal, wherein the response message comprises the ticket.

5. The method of claim 1, wherein obtaining further includes obtaining the unique ticket identifier from the ticket purchase request as ticket information that accompanies the ticket purchase request provided by the vendor terminal.

6. The method of claim 1, wherein obtaining ticket information as an encoded Quick Response (QR) code or an encoded barcode that was scanned at the vendor terminal during purchase of the ticket.

7. The method of claim 1, wherein generating further includes:
 obtaining the security code for the ticket;
 concatenating the secure code onto the unique ticket identifier forming a concatenated string;
 generating the salt value for the concatenated string;
 pre-pending or concatenating the salt value onto the concatenated string forming a second concatenated string; and
 hashing the second concatenated string and obtaining the cryptographic value for the unique ticket identifier.

8. The method of claim 7, wherein generating the salt value further includes randomly generating the salt value based on the concatenated string to a randomly determined length of at least 8 bytes.

9. The method of claim 8, wherein storing further includes storing the salt value, a hash value obtained from hashing concatenated string, and the cryptographic value in the record.

10. The method of claim 9 further comprising:
 receiving a redemption ticket from a different vendor terminal;
 obtaining a second unique ticket identifier for the redemption ticket;
 obtaining a second security code for the redemption ticket;
 concatenating the second security code on the second unique ticket identifier forming a third concatenated string;
 obtaining a candidate hash value from hashing the third concatenated string;
 searching candidate records for the candidate hash value and matching to the record on the hash value;
 pre-pending or concatenating the second salt value on the third concatenated string forming a fourth concatenated string;
 hashing the fourth concatenated string and obtaining a second cryptographic value; and
 comparing the second cryptographic value against the cryptographic value in the record and sending an authentication message to a ticket redemption server when matched.

11. The method of claim 10, wherein comparing further includes sending a non-authenticated message to the redemption server when the second cryptographic value does not match to the cryptographic value of the record.

12. The method of claim 10, wherein comparing further includes sending the vendor terminal identifier of the record, the current date of the record, and the current time of day of the record to the redemption server as audit information identifying where and when the redemption ticket was originally purchased when the second cryptographic value matched to the cryptographic value of the record.

* * * * *